United States Patent Office 2,825,676
Patented Mar. 4, 1958

2,825,676

BIS-p-FLUOROBENZYL DISULFIDE AND ACARI-CIDAL COMPOSITIONS THEREWITH

Herbert Aubrey Stevenson, Nigel George Clark, and John Ernest Cranham, Nottingham, England, assignors to Boots Pure Drug Company Limited, Nottingham, England, a British company No Drawing. Application August 17, 1954
Serial No. 450,529

Claims priority, application Great Britain August 20, 1953

5 Claims. (Cl. 167—30)

The invention relates to a aryl disulphide which has been found to possess valuable properties.

The present invention relates to the novel compound, bis-p-fluorobenzyl disulfide and the compositions containing such compound. We have found that dusts, dispersions and emulsions of the compound have properties which render them valuable for the control of the eggs and active stages of mites (acari), in particular the plant feeding Tetranychidae or red spider mites, e. g. Tetranychus telarius L. and Metatetranychus ulmi Koch. Our invention consists, therefore, in the compound and in dusts, dispersions and emulsions of these compounds which may be used for horticultural purposes.

The compound of the invention may be prepared by methods which are well-known in the art for the synthesis of aryl and aralkyl disulphides. For example the compound may be prepared by the reduction of p-fluorobenzyl sulfonyl chloride using sulphur dioxide in the presence of a trace of hydriodic acid or the compound may be prepared by heating a p-fluorobenzyl halide with a mixture of sodium sulphide and powdered sulphur in aqueous solution. The compound may also be prepared by oxidation of the corresponding thiol, for example by treating the thiol in a solution of sodium ethoxide in alcohol with an alcoholic solution of iodine.

The dispersions having a solid dispersed phase according to the invention may comprise the active ingredient, bis-p-fluorobenzyl disulfide, in combination with a dispersing agent and/or a suspending agent in aqueous medium. For convenience the preparation may consist of active ingredient admixed with a dispersing agent and/or a suspending agent such that a dispersion is formed when the mixture is added to water. To facilitate the formation of a dispersion in this manner, the preparation to be diluted may also contain a water miscible organic solvent, for example, acetone. The dispersions according to the invention also include suspensions in which the solid dispersed phase is admixed with an aqueous oil emulsion, the active ingredient being substantially insoluble in the oil thereof, which oil is preferably a non-volatile oil, for example, liquid paraffin.

The emulsions according to the invention may comprise the active ingredient in combination with an emulsifying agent and organic solvent, for example, xylene or an aromatic solvent boiling within the range 80–300° C. It may be advantageous to add a non-volatile vegetable or mineral oil such as liquid paraffin to act as an activator and/or sticker. The emulsion composition according to the invention may also contain a wetting agent. For convenience the composition may consist of active ingredient admixed with or in solution in an organic solvent as hereinbefore specified together with an emulsifying agent, and, if desired, a wetting agent such that an emulsion is formed on admixing the composition with water. Such compositions also form part of the present invention. The aqueous dispersions and emulsions herein described may be diluted with water before application to obtain a final concentration of active ingredient within the range 0.001–10% w./v. but the invention is not limited to compositions which contain this concentration of active ingredient; the concentration in the solutions which are employed depends upon the requirements of the particular spraying machine which is to be used.

Dispersions of active ingredient in which the base is a pulverulent solid diluent also form part of the present invention. Such dispersions may contain up to 50% w./v. of the active ingredient.

We have found that it is possible to employ the compounds of the above general formula in the form of smokes, mists and aerosols. This method of application is very convenient when the plants, which it is desired to treat for the control of the mites, are located in an enclosed area, for example, in a greenhouse.

Accordingly our invention also comprises compositions for the preparation of acaricidal smokes, mists and aerosols which contain bis-p-fluorobenzyl disulfide as active ingredient.

In the preparation of mists and aerosols which contain bis-p-fluorobenzyl disulfide as active ingredient, the active ingredient may be dissolved in a mixture of a non-volatile oil, such as a vegetable oil and a miscible supplementary solvent such as cyclohexanone or acetone. The solution so obtained may be dispersed by mechanical means or by incorporating in the solution a volatile propellant such as Freon (a mixture of chlorofluoro derivatives of methane and ethane).

The following non-limitative examples illustrate the invention.

*Example 1*

In the preparation of bis-p-fluorobenzyl disulphide, 1.65 grams of powdered sulphur are added to a solution of 12.4 grams of the nonahydrate of sodium sulphide in 10 cc. of water. The resulting disulphide solution is added to a solution of 19.5 grams of p-fluorobenzyl bromide in 100 ccs. of ethanol. The mixture is refluxed for two hours, after which the mixture is poured into excess cold water, when an oil is precipitated which subsequently solidifies. The solid is collected and crystallised twice from ethanol. There is thus obtained bis-p-fluorobenzyl disulphide in the form of colourless crystals which have a melting point of 62–63° C.

[Found: C, 59.75; H, 4.3; $C_{14}H_{12}F_2S_2$ requires C, 59.6; H, 4.3%.]

In the preparation of a composition suitable for dilution with water to obtain a stable emulsion, sufficient bis-p-fluorobenzyl disulphide is dissolved in a mixture of 10 parts by volume of Insem 108 (a proprietary non-ionic emulsifying agent which is an oleic ester of a glycol) and 90 parts by volume of xylene to obtain a solution which contains 20% w./v. of the active ingredient.

We claim:

1. Bis-p-fluorobenzyl disulphide.

2. An acaricidal composition comprising bis-p-fluorobenzyl disulfide as its active ingredient and a diluent.

3. An acaricidal composition according to claim 2 which is in the form of a dust.

4. An acaricidal composition according to claim 2 which is in the form of a dispersion.

5. An acaricidal composition according to claim 2 which is in the form of an emulsion.

References Cited in the file of this patent

UNITED STATES PATENTS

| | | |
|---|---|---|
| 2,185,009 | Babcock | Dec. 26, 1939 |
| 2,330,234 | Moyle | Sept. 28, 1943 |
| 2,452,759 | Hyman | Nov. 2, 1948 |
| 2,695,898 | Lober | Nov. 30, 1954 |

FOREIGN PATENTS

| | | |
|---|---|---|
| 700,615 | Germany | Nov. 28, 1940 |

OTHER REFERENCES

Bourcart: "Insecticides, Fungicides and Weed Killers," 2nd ed., 1925, Scott Greenwood and Son, London, p. 396.

Brown: "Insect Control by Chemicals," John Wiley and Sons, New York, N. Y., 1951, p. 136.

Frear: "Catalogue of Insecticides and Fungicides," vol. 1, 1947, p. 45, Chronica Botanica Co., Waltham, Mass.